July 19, 1949.  D. H. NELSON ET AL  2,476,317

APPARATUS AND METHOD FOR FAULT LOCATION

Filed May 8, 1943

INVENTORS
D. H. NELSON
J. R. COSBY

BY W. C. Middleton

ATTORNEY

Patented July 19, 1949

2,476,317

UNITED STATES PATENT OFFICE 2,476,317

APPARATUS AND METHOD FOR FAULT LOCATIONS

Dale H. Nelson, Southampton, N. Y., and James R. Cosby, Towson, Md., assignors to The Western Union Telegraph Company, New York, N. Y., a corporation of New York Application May 8, 1943, Serial No. 486,162

7 Claims. (Cl. 175—183)

This invention relates to apparatus for and methods of locating open faults in communication lines and more particularly to such apparatus and methods as are especially adapted for use in connection with switchboards of terminal offices and test offices of communicating systems.

Heretofore various methods have been utilized in the attempt to determine, by switchboard, or office, methods, the location of open faults along communication lines. All of such efforts, however, have proved unsatisfactory for many reasons such as the complexities of phase shift, leakage resistance, series line resistance, and the presence of stray capacitances to ground or other wires which vary in accordance with conditions.

An object of the present invention is to provide apparatus for and methods of locating open faults in communication lines by determining the capacitance between the faulted line and a companion line, both at a time prior to fault therein, and at a time subsequent to fault therein.

Another object of the invention is to provide apparatus and methods in accordance with the foregoing in which provision is made for eliminating or balancing the effects due to resistance in series with capacitance.

Another object of the invention is to provide apparatus and methods as aforesaid in which provision is made for eliminating or balancing leakage resistance which may interfere with proper determination of capacitance.

A further object of the invention is to provide apparatus and methods whereby the true capacitance between two lines can be determined by a series of computations each arrived at by use of a capacity bridge connected successively in a suitable manner and in suitable combinations to the lines under test.

Another object of the invention is to provide apparatus for carrying out methods as described previously in which simple switching arrangements make possible the application of direct current to the bridge and communication lines connected thereto for the purpose of balancing leakage resistance and also make possible the application of alternating current of a predetermined character to such bridge for the purpose of balancing resistance in series with capacitance and also for balancing capacitance.

In carrying out the foregoing and other objects of the invention use is made of a capacity bridge which can be connected to the communication lines under test in such fashion that by taking a series of readings, one for each particular line connection to the bridge, and by combining these readings in proper fashion, the true or actual capacitance between the two lines under test can be determined. In order that the two lines can be connected to the bridge successively in various manners, suitable switch mechanism has been provided. Inasmuch as leakage resistance may be encountered and such resistance may be of such magnitude and may be so located or disposed as to interfere with accurate determination of capacitance, the apparatus includes switching arrangements associated with a source of direct current and the bridge has included in one arm thereof a suitable rheostat whereby the leakage resistance can be balanced. In addition the same switching arrangements have associated therewith a source of alternating current of predetermined character whereby such alternating current can be applied to the bridge, and one arm of the bridge is provided with a suitable potentiometer, as well as an adjustable condenser, which two elements can be adjusted alternately until a balance has been obtained. The adjustable condenser is of such character that any adjustment thereof becomes apparent on a scale so that the value of this condenser at any adjusted figure can be read readily.

In the use of the apparatus as briefly described, the capacitance between two wires or communication lines is determined upon their installation or at any other time at which these lines are in normal condition. This determination is made in such a manner as to eliminate or balance leakage resistance and resistance in series with the capacitance and also to eliminate any stray capacitances between the wires under test and other wires and also to ground. Once the capacitance between the two wires has been determined under normal conditions, record can be made thereof so that should one or both of these lines become open faulted, a repetition of the original procedure will determine the capacitance between the lines in faulted condition and from the difference between the measurements so made and the recorded measurements, the location of the open fault can be determined with close accuracy.

Other features, objects and advantages of the invention will become apparent by reference to the following detailed description read in the light of the accompanying drawings wherein.

Figure 1:
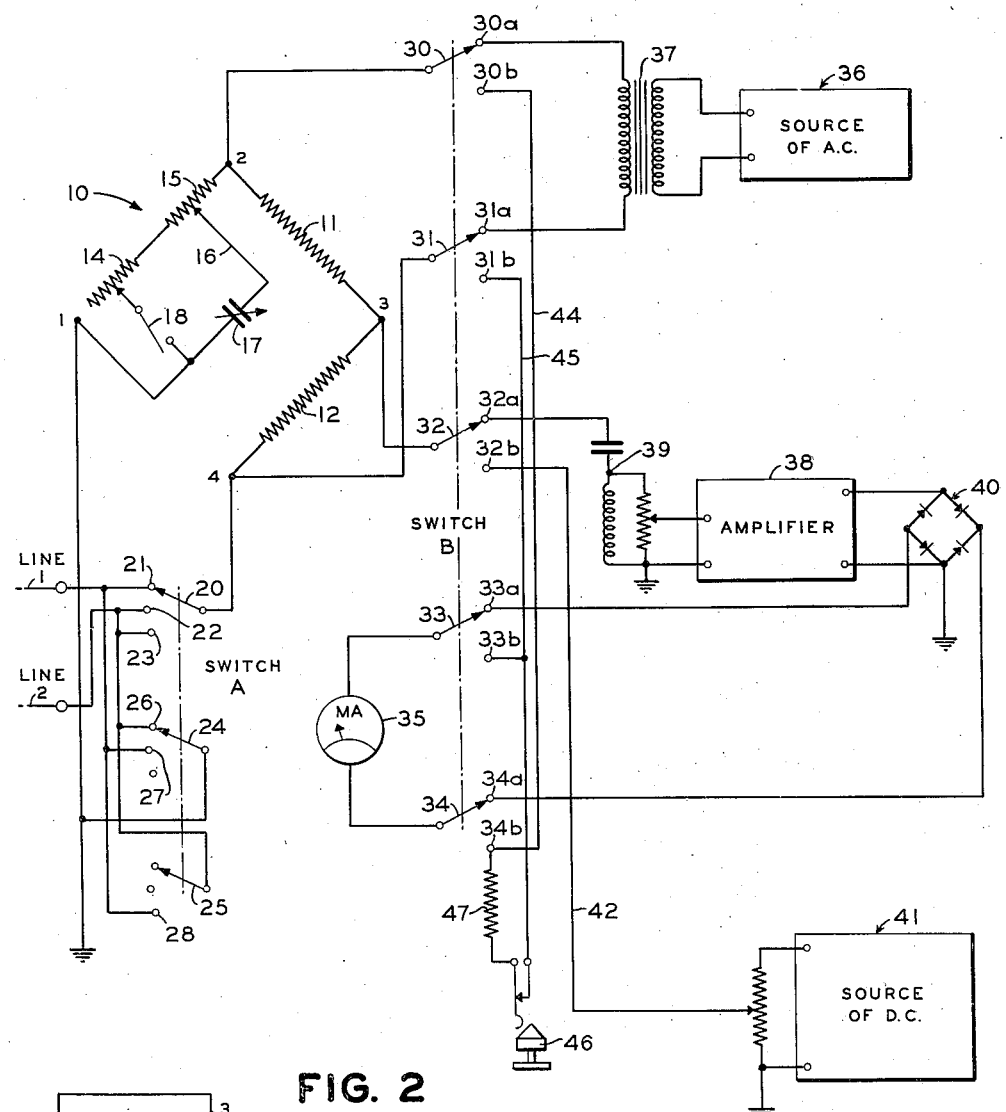
Fig. 1 represents a schematic circuit diagram of the apparatus involved.

Referring now to the drawings, 10 indicates generally a capacity bridge having resistors 11 and 12 in two arms thereof with these resistors being of identical value. A third arm of the bridge has a rheostat 14 therein and also a potentiometer 15 with an adjusting member 16 of the potentiometer connected to an adjustable condenser 17, the other terminal of which leads to an end 1 of this arm of the bridge, which end is grounded. A switch 18 is connected between the rheostat 14 and one end of the condenser 17 so that when the switch is closed, the valve of the resistance between the two ends of the arm can be varied.

One end of the arm of the bridge having the resistor 12 therein is connected to the pole 20 of a switch A which pole can make contact selectively with any of three terminals 21, 22 or 23. The switch A is of a type having three poles mounted on a single operating shaft in insulated fashion whereby each of the three poles 20, 24 and 25 moves in unison. The poles 24 and 25 likewise can make contact selectively each with three terminals; the pole 24 with terminals 26 and 27 (the third terminal not being used) and the pole 25 with only the live terminal 28 of its series.

A second switch B is provided with five poles 30, 31, 32, 33 and 34. Each of these poles can make contact selectively with one of a pair of terminals and each of the poles is mounted on the same operating shaft so that all thereof move in unison. The terminals associated with the pole 30 are 30a and 30b; those with the pole 31 are identified as 31a and 31b and so on through the entire series. A measuring instrument 35 in the nature of a direct current milliammeter has its terminals connected to the two poles 33 and 34.

A source of alternating current 36 of any suitable predetermined nature is shown as having the secondary of its output transformer 37 connected to the two terminals 30a and 31a. This source of alternating current 36, if desired, can be in the nature of a vacuum tube oscillator and for purposes of the present invention the output of this oscillator can be of the nature of 35 cycles, or of any other desired frequency. A vacuum tube amplifier 38 has its input, which includes a tuned circuit indicated generally at 39, connected to the terminal 32a. This input tuned circuit 39 is preferably tuned to the same frequency as the source of alternating current 36, i. e., 35 cycles. The output of amplifier 38 is rectified by a rectifier 40 of well known type, one side of which is grounded, and the rectifier 40 is connected to the two terminals 33a and 34a.

A source of direct current 41 of any conventional character has one side of its output grounded as shown and through the agency of a potentiometer is connected by line 42 to the terminal 32b. The terminal 30b is connected by line 44 to terminal 34b, while terminal 31b is connected by line 45 to terminal 33b and also to terminal 34b through a push button switch 46 and resistor 47.

As before mentioned, the point 1 of the bridge 10 is connected to ground, and as shown, the other three points are connected to poles of the switch B, point 2 being connected to pole 30, point 3 to pole 32, and point 4 to pole 31.

In determining the actual capacitance between two wires, these wires, designated as lines 1 and 2, are connected to the terminals of the switch A, as shown in the drawing, and then the mechanism is utilized in such fashion as to eliminate the stray capacitance between the wires due to the capacity of each wire to ground or surrounding wires; to eliminate the effect of resistance in series with capacitance; and to eliminate or balance out any leakage resistance which may exist from either side of the pair of wires to ground or between the two wires. By so proceeding, the actual capacitance between the two wires can be determined.

To this end, with the two lines or wires connected to the switch A, as shown, the poles 20, 24 and 25 are moved simultaneously to their uppermost position, in which condition the pole 20 is in contact with the terminal 21 connected directly to the line 1, and the pole 24 is in contact with the terminal 26 which is connected to the line 2. The pole 24 is grounded as shown, while the pole 20 is connected to point 4 of the bridge 10. Point 1 of this bridge is also grounded. The first step in determining the actual capacitance between the wires is to obtain a reading of the condenser 17 with the wires connected in this fashion, and in so proceeding the source of D. C. 41 is connected to point 3 of the bridge, and this is accomplished by moving the switch B to such position that each pole thereof is in contact with its lowermost or "b" terminal. Due to such positioning of switch B, it follows that the source 41 is connected by line 42, terminal 32b and pole 32 to the point 3 of the bridge 10. One side of the source 41 is grounded. Simultaneously, a connection is made between point 2 of the bridge through the pole 30, contact 30b and line 44 to the contact 34b, and pole 34 to the milliammeter 35. Likewise, point 4 of the bridge is connected through pole 31, contact 31b, line 45 to terminal 33b, pole 33, to the other side of the milliammeter. However, a shunt circuit extends from the pole 33b through the switch 46 and low resistance 47 to the terminal 34b. As long as the switch 46 is in the closed condition and switch B is in the lowermost or "b" position, most of the unbalance current through lines 44 and 45 will pass through the shunt resistor 47, protecting the milliammeter 45 against excessive currents. By opening this switch 46, the path of current flow will be entirely through the milliammeter.

With D. C. applied to the bridge, the switch 18 can be closed and the rheostat 14 adjusted to compensate or balance out any combination of leakage resistance which may be present from either lines 1 and 2 to ground or between these lines 1 and 2. The rheostat 14 is of such size as to have a maximum resistance of approximately one megohm, it being understood that leakage resistance will have appreciable effect on the set-up only if it is of an order of less than 1,000,000 ohms, for the average communication line. If such leakage exists, the rheostat 14 is adjusted until the balance point of the bridge is indicated by a zero reading on the milliammeter 35. Operation of switch 46 as the balance point is approached increases the sensitivity, due to reasons stated heretofore. With the bridge 10 in direct current balance, the sum of the resistance in circuit in the rheostat 14 and the entire resistance of the potentiometer 15 is equivalent to the sum of the line resistance to the point of leakage and the leakage resistance.

The position of the arm 16 of the potentiometer 15 will not affect the direct current balance, so that only one adjustment, that of rheostat 14, is required for the direct current balance. Should there be a leakage resistance which must be balanced out, it is necessary that this direct current balance setting of the rheostat 14 be maintained during the further operation of the system and completion of the alternating current balance, and that switch 18 be maintained in the closed position. In the event, however, that the leakage resistance is greater than 1,000,000 ohms, its presence would have no material effect on the subsequent operation of the system so that switch 18 would be opened.

Having balanced out the leakage resistance in this particular line hook-up, the switch B is then thrown in the opposite direction, i. e., to the uppermost position shown in the drawings. Under these conditions alternating current of a predetermined character (for example, 35 cycles) is impressed upon the points 2 and 4 of the bridge through the connections shown from the secondary of transformer 37 and poles 30 and 31 of switch B. Point 1 of the bridge is still grounded, while point 3 thereof is connected through the pole 32 of the switch to the input of the amplifier 38, the tuned circuit 39 included therein being tuned to the frequency of the source 36 to minimize interference from adjacent power lines or communication lines. The output of this amplifier after being rectified is impressed upon the two terminals of the milliammeter 35 through the poles 33 and 34 of the switch B. Since the potentiometer 15 is provided for the purpose of balancing out the effect of the line resistance in series with the line capacitance and since the condenser 17 is of a character as to be direct reading so that the capacitance setting thereof at any time can be noted readily, it follows that alternate adjustment of the potentiometer 15 and of the condenser 17 will eventually result in a null on the milliammeter 35 which serves as a galvanometer. When such null has been reached, the setting of the condenser 17 is noted, such reading representing the sum of the capacitance between the two wires 1 and 2 and between wire 1 and ground, since wire 2 has already been grounded by pole 24 of switch A. The bridge condenser 17 reading so obtained may, for purposes of convenience, be called C1, and it represents the condition just stated. Inasmuch as other readings must be taken, this reading should be noted as $$C1 = C1g + Cw$$

where $Cw$ equals the capacitance between wires 1 and 2, and $C1g$ equals the capacitance between wire 1 and ground.

The poles of switch A are next moved to their intermediate position in which, so far as connections are concerned, the poles 20 and 24 are connected respectively to their terminals 22 and 27. Under this condition wire or line 2 is connected to the point 4 of bridge 10, through pole 20, and line 1 is grounded through pole 24 of the switch. By duplicating the proceeding outlined previously for both the direct and alternating current balances, we arrive at the second reading of the bridge condenser 17, which reading is called C2.

$$C2 = C2g + Cw$$

where $C2g$ equals the capacitance between wire 2 and ground.

A still third reading is taken following adjustment of switch A to the lowermost position in which pole 20 is connected to terminal 23, and pole 25 is connected to terminal 28. With this set-up both wires are connected together and are connected through pole 20 to point 4 of the bridge. Duplicating the procedure outlined previously, we arrive at the third reading of the bridge condenser 17, called C3.

$$C3 = C1g + C2g$$

Note that $Cw$ is not present as the two wires 1 and 2 are connected together for this reading. Combining these three equations for three unknowns, the result is $$Cw = \frac{C1 + C2 - C3}{2}$$

$Cw$ is the actual capacitance between the two wires and should be recorded in the switchboard records in the same manner as resistances are now recorded. This is true whether the lines be single wires, twisted pairs, or cables, it being understood that generally each wire leading out of a central office or test office has a companion wire, and that the capacitance between the two would be a mutual characteristic and so noted in the records.

Figure 2:
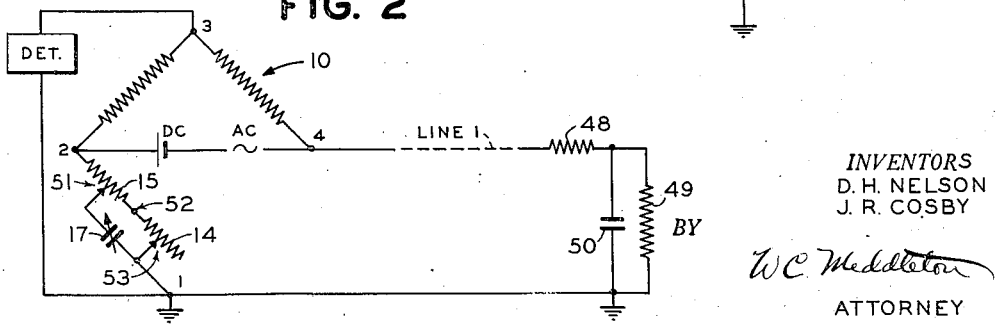
Fig. 2 represents a simplified bridge circuit diagram of the same apparatus.

Referring again to the drawings, and particularly Fig. 2, 10 again indicates generally the same capacity bridge as heretofore described, but now shown in a simplified form and connected to a simplified equivalent of the communication line 1. This equivalent line 1 has a total capacitance C1 to ground designated 50 which will be understood to represent the sum total of all the capacitances to ground, directly or through adjacent wires. This capacitance 50 has an effective series line resistance designated 48 and a leakage resistance to ground, directly or through adjacent wires, designated 49. As a result of the direct current balance and as heretofore described, the sum of the resistance in circuit in the rheostat 14 and the entire resistance of potentiometer 15 is equal to the sum of the series line resistance 48 and the leakage resistance 49. By keeping rheostat 14 in this position during the ensuing alternating current balance, the solution to the sum of the two unknown line resistances 48 and 49 is retained in the bridge without the necessity of solving for either one. After potentiometer 15 and capacitance 17 have been alternately adjusted until the bridge is in an alternating current balance, the circuit is completely solved, inasmuch as the resistance in potentiometer 15 between points 2 and 51 is equal to the effective series line resistance 48, and as the resistance in potentiometer 15 between points 51 and 52 plus the resistance in circuit in rheostat 14 is equal to the line leakage resistance 49, and as the capacitance of condenser 17 is equal to the line capacitance 50.

It will be quite apparent that while the capacity bridge heretofore described has been described in operation on a communication line, its use in solving resistance-capacitance networks of the simple type illustrated in the drawings is also a desired use. It will also be evident that a calibration of the dials operating rheostat 14 and potentiometer 15 will permit the direct reading of effective series line resistance and a simple computation of the line leakage resistance. It will also be evident that the scope of operation of this capacity bridge is not limited to communication lines, and that its use on other lines such as power lines, remote control lines, etc. is also desired. It will also be evident that while the name "capacity bridge" has been given to the apparatus heretofore described, such terminology does not prevent it from functioning primarily as a "series line resistance" or as a "line leakage" bridge, where such measurements are to be the primary function of such apparatus.

Should one of the wires leading from an office become open faulted, the procedure outlined above is carried out in full detail for this wire and its companion, and the capacitance so determined is compared with the capacitance of record for the wires in their normal condition. Since the length of the line is known, it follows that capacitance per unit of distance under normal circumstances can be computed so that, with the capacitance between the wires with one thereof open faulted being determined in the manner before described, the distance to the fault can be likewise computed in accordance with the formula for capacitance per unit of length.

The method involved in the use of the apparatus heretofore described is, as before stated, applicable to twisted pairs of wires, separated or spaced pairs, and also cables, and has the advantage that this procedure is straight-forward, since the bridge is direct reading, so far as the condenser 17 is concerned. It follows, therefore, that an operator merely adds the first two readings, subtracts the third reading, and divides by two, with the result that the actual capacitance between the two wires will be accurately determined if leakage resistance and the effect of resistance in series with capacitance have been balanced out. Once capacitance has been determined, the distance to a fault can readily be computed. It will be understood that modifications, both in apparatus and in method of using the same, can be followed without departing from the scope and spirit of the invention, in view of which any limitations imposed thereupon are to be only those set forth in the following claims.

What is claimed is:

1. Apparatus of the character described comprising a capacitance bridge for connection to a pair of transmission lines, means for alternately applying direct current and alternating current to said bridge, adjustable means in one arm of said bridge for balancing any leakage resistance in said lines, adjustable means in one arm of said bridge for balancing resistance in series with capacitance in said lines, and adjustable means in one arm of said bridge for balancing capacitance in said lines.

2. Apparatus as described in claim 1, in which provision is made for a direct current meter, and means for connecting said meter to said bridge while direct current is applied thereto.

3. Apparatus in accordance with claim 1, in which provision is made for a direct current meter, an amplifier and a rectifier, and means for connecting said meter to said bridge with said amplifier and said rectifier interposed therebetween while alternating current is applied to said bridge.

4. Apparatus as described in claim 1, in which provision is made for a direct current meter, an amplifier and a rectifier, and switching means operable in one position to connect said source of direct current and said meter to said bridge and in another position to connect said source of alternating current and said meter to said bridge with said amplifier and rectifier interposed between the bridge and the meter.

5. The method of determining characteristics of two communication lines, which comprises connecting first one line and then the other to ground and finally connecting both lines together, and at each of said connections applying direct current to said lines, balancing leakage resistance effects, removing direct current, applying alternating current to said lines and balancing resistance in series with capacitance effects and capacitance to obtain three capacitance values.

6. The method of determining characteristics of two communication lines, which comprises connecting first one line and then the other to ground and finally connecting both lines together, and at each of said connections applying direct current to said lines, balancing leakage resistance effects, removing direct current, applying alternating current to said lines and balancing resistance in series with capacitance effects and capacitance to obtain three capacitance values from which the actual capacity between the lines can be computed.

7. The method of determining characteristics of a network of the character described and involving capacitance with resistance in series and parallel relations thereto, which comprises applying direct current to said network, balancing resistance in series and in parallel relation to the capacitance of the network, removing direct current, applying alternating current to said network, and balancing resistance in series with capacitance and capacitance.

DALE H. NELSON.
JAMES R. COSBY.

REFERENCES CITED

The following references are of record in the file of this patent:

UNITED STATES PATENTS

| Number | Name | Date |
|---|---|---|
| 1,166,159 | Thomas | Dec. 28, 1915 |
| 1,361,026 | Demarest et al. | Dec. 7, 1920 |
| 1,369,403 | Demarest et al. | Feb. 22, 1921 |
| 1,540,799 | Nunn | June 9, 1925 |
| 1,565,613 | Anderegg | Dec. 15, 1925 |
| 1,899,824 | Edwards | Dec. 6, 1932 |
| 1,958,361 | Estes et al. | May 8, 1934 |
| 2,178,617 | Stein | Nov. 7, 1939 |

OTHER REFERENCES

Beck et al., The Electrical Review, Sept. 29, 1933, pp. 419-420.

Laws, "Electrical Measurements," McGraw-Hill Book Co., Inc., New York, 1917, pp. 392-393, 690-691. (Copy in Division 48.)